(12) United States Patent
Järvenkylä

(10) Patent No.: US 6,372,168 B1
(45) Date of Patent: Apr. 16, 2002

(54) METHOD OF MANUFACTURING BRANCHED PIPE

(75) Inventor: Jyri Järvenkylä, Hollola (FI)

(73) Assignee: Uponor Innovation AB, Fristad (SE)

(*) Notice: Subject to any disclaimer, the term of this patent is extended or adjusted under 35 U.S.C. 154(b) by 0 days.

(21) Appl. No.: 09/465,168

(22) Filed: Dec. 17, 1999

(30) Foreign Application Priority Data

Dec. 23, 1998 (FI) .................................................. 982798

(51) Int. Cl.⁷ .............................................. B29C 47/00
(52) U.S. Cl. ................. 264/167; 264/209.3; 264/210.2; 425/393; 425/395
(58) Field of Search ............... 264/167, 177.1, 264/177.14, 177.16, 177.17, 209.1, 209.2, 209.3, 209.4, 210.2; 425/393, 396, 395, 380

(56) References Cited

U.S. PATENT DOCUMENTS

| | | | |
|---|---|---|---|
| 4,663,812 A | * | 5/1987 | Clausen |
| 4,865,797 A | * | 9/1989 | Jarvenkyla |
| 4,952,362 A | * | 8/1990 | Jarvenkyla et al. |
| 5,018,959 A | * | 5/1991 | Jarvenkyla |
| 5,139,730 A | * | 8/1992 | Holso et al. |
| 5,340,299 A | * | 8/1994 | Jarvenkyla et al. |
| 5,405,569 A | * | 4/1995 | Lupke |
| 5,881,595 A | * | 3/1999 | Sorensen |

FOREIGN PATENT DOCUMENTS

| | | | |
|---|---|---|---|
| DE | 1233128 | | 1/1967 |
| EP | 0237900 | | 9/1987 |
| EP | 0543243 | | 5/1993 |
| GB | 1032691 | * | 6/1966 |
| GB | 1147385 | | 4/1969 |
| WO | 9100797 | | 1/1991 |

OTHER PUBLICATIONS

English Abstracts of JP 3007320 dated Jan. 14, 1991 by two Derwent and Patent Abstracts of Japan.
Two English Abstracts of JP 7314518 dated Dec. 5, 1995 by Derwent and Patent Abstract of Japan.

* cited by examiner

Primary Examiner—Mark Eashoo
(74) Attorney, Agent, or Firm—Ladas & Parry

(57) ABSTRACT

A branched pipe (5) is manufactured by continuous extrusion in such a manner that a manifold (5a) of a branched pipe (5) is manufactured by extruding plastic material into the space defined by moving chill molds (1, 2) and a mandrel (10) arranged therein with an extruder (4). The manifold (5a) is provided with branch pipes (5b) simultaneously with the extrusion thereof.

6 Claims, 3 Drawing Sheets

METHOD OF MANUFACTURING BRANCHED PIPE

The invention relates to a method of manufacturing a branched pipe.

The invention also relates to a pipe manufacturing apparatus, which comprises at least two sets of moving chill moulds, a mandrel arranged inside the chill moulds, at least one extruder for feeding plastic material into the mould defined by the chill moulds and the mandrel for manufacturing a manifold.

The invention further relates to a branched pipe comprising a manifold and at least one branch pipe.

A branched pipe, such as a bypass manifold or a branched pipe fitting, is typically manufactured from metal, such as brass, or from plastic by means of die-casting. This kind of manufacturing process of branched pipes is cyclical, the length of the articles is limited and as a result, the manufacture of branched pipes is rather expensive and laborious. There are also solutions which require either several single branches attached to one another or preferably a long pipe comprising several branches. Such solutions are needed e.g. in heat exchangers, in heating systems of sports grounds, in collectors of solar energy and in other corresponding solutions where several pipes are to be attached to a collecting pipe. Typically such branched pipes are made from an ordinary pipe to which a number of short pipes are welded, and pipes to be attached are welded or attached with a mechanical coupler to these short pipes. Such a branched pipe easily becomes very expensive since the welding of short pipes thereto is usually done manually. On the other hand, if for example T-branched pipe fittings are used for branching, the solution will be extremely expensive since there may be dozens or even hundreds of pipes to be attached.

The object of the present invention is to provide a branched pipe and a method and apparatus for the manufacture thereof, which allow to avoid the above-mentioned drawbacks.

The method of the invention is characterized in that plastic material is extruded into a mould defined at least by two sets of moving chill moulds and a mandrel arranged inside the chill moulds in such a manner that a manifold of a branched pipe is manufactured and the manifold of the branched pipe is provided with branch pipes simultaneously with the manufacture of the manifold.

The pipe manufacturing apparatus of the invention is further characterized in that the apparatus comprises heating means for the chill moulds and/or the mandrel arranged inside the chill moulds for heating the extruded plastic material above a melting point of the material and to a level required by crosslinking caused by heat.

The branched pipe of the invention is further characterized in that the manifold is manufactured by continuous extrusion and the branch pipe is arranged to the manifold in connection with the manufacture of the manifold.

The essential idea of the invention is that a manifold is manufactured by continuous extrusion by supplying the material to be extruded to the space defined by moving chill moulds and a mandrel arranged inside the chill moulds. Furthermore, the manifold is provided with branch pipes simultaneously with the extrusion thereof. The idea of a preferred embodiment is that the chill moulds are provided with branch pipe cavities for extruding the branch pipe simultaneously with the manifold and during the manufacture a branch pipe mandrel is arranged inside the branch pipe cavity so as to form a hole inside the branch pipe. The idea of another preferred embodiment is that prefabricated branch pipes are attached to a manifold during the manufacture thereof. The idea of a third preferred embodiment is that the branch pipes are made flexible.

An advantage of the invention is that branched pipes can be manufactured quickly and effectively, which reduces their manufacturing costs considerably. Furthermore, by making the branch pipe flexible, the pipes to be attached can be arranged in their places firmly in advance and attached to the collector pipe without the tolerance changes substantially hindering the task of arranging the pipes.

The invention will be described in the accompanying drawings, in which

Figure 2:
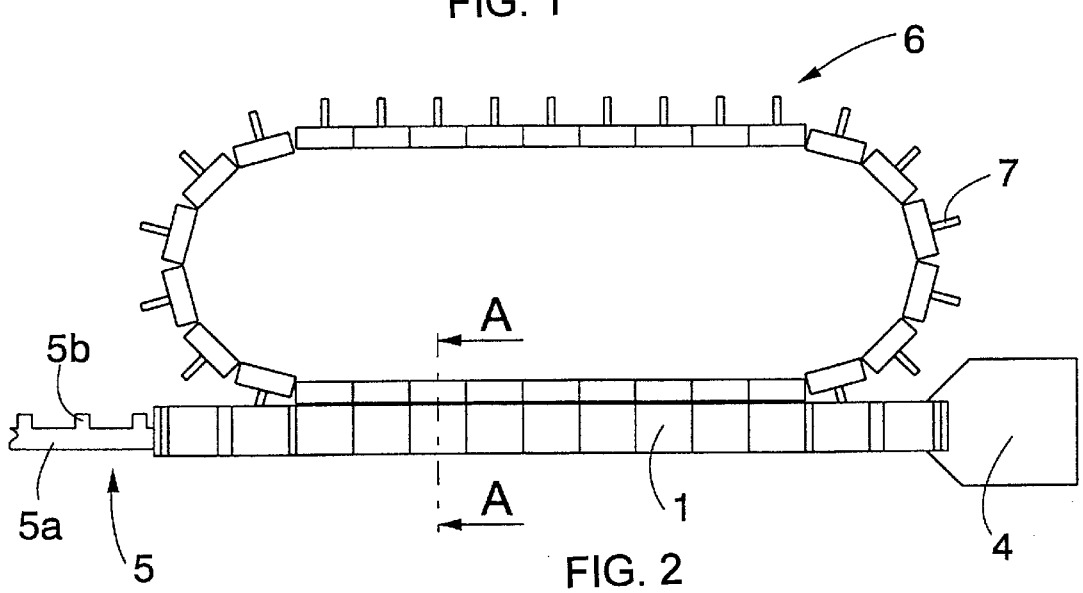
FIG. 2 is a top view of the apparatus according to FIG. 1.
Figure 3A:
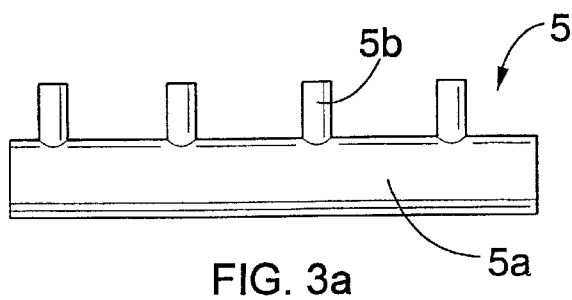
Figure 3B:
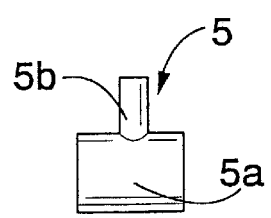
Figure 4:
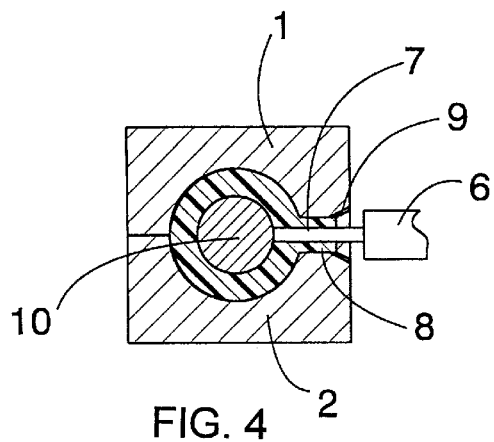
Figure 5:
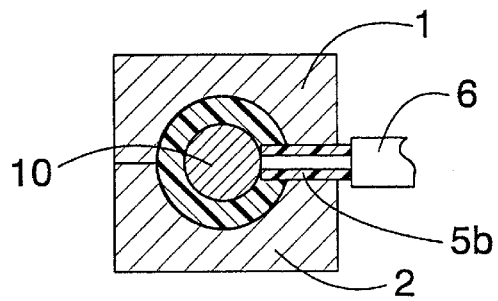
Figure 6:
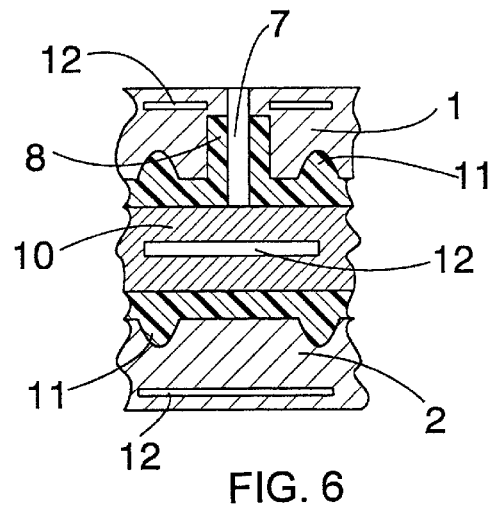
Figure 7A:
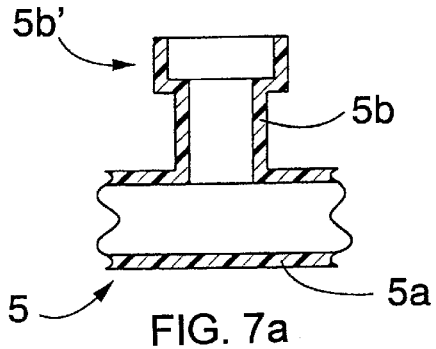
Figure 7B:
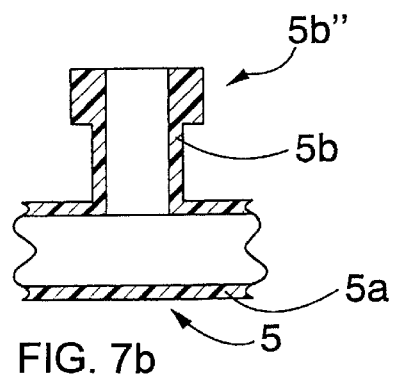
Figure 8:
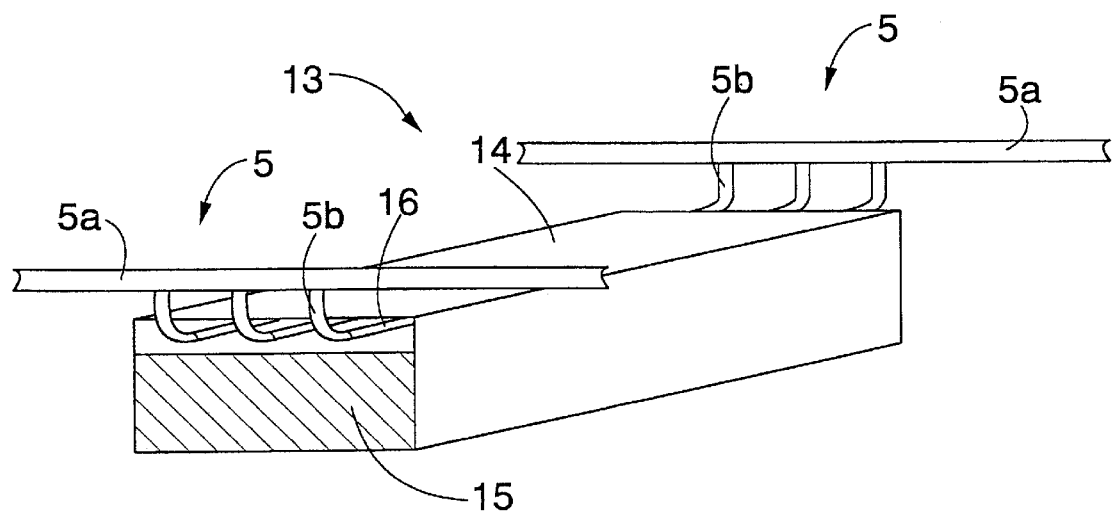

FIGS. 3a and 3b schematically illustrate some branched pipes of the invention,

FIG. 4 is a cross-sectional view of the apparatus of FIG. 2 along line A—A,

FIG. 5 is a schematic cross-sectional view of a detail of another apparatus according to the invention from the direction of travel of the material, FIG. 6 is a schematic cross-sectional side view of a detail of a third apparatus according to the invention, FIGS. 7a and 7b are schematic cross-sectional side views of some parts of the pipes of the invention, and FIG. 8 is a schematic view of a flow element of the invention.

Figure 1:
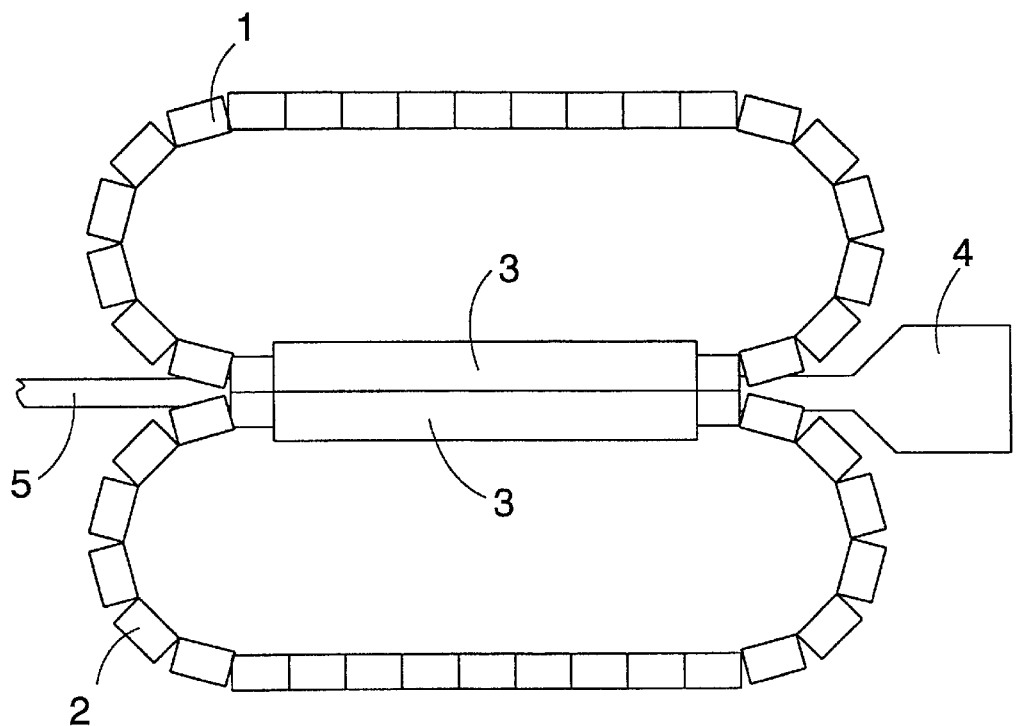
FIG. 1 is a schematic side view of an apparatus of the invention.

FIG. 1 illustrates an apparatus which comprises two sets of chill moulds 1 and 2 which move along endless tracks and are opposite to each other at the guide rails 3 so that they form a substantially cylindrical mould. There is a mandrel arranged inside the chill moulds. Plastic material is fed into the mould defined by the chill moulds 1 and 2 and the mandrel with an extruder 4. FIG. 1 also illustrates a continuous branched pipe 5 manufactured with the apparatus. The basic structure of this apparatus is known per se to a person skilled in the art and therefore it is not described in detail here. The basic structure of a continuous casting apparatus suitable for this purpose is described e.g. in European Patent No. 0,237,900.

FIG. 2 illustrates a branch pipe track 6 where branch pipe mandrels 7 circle around an endless track in the same way as the chill moulds 1 and 2. The movement of the branch pipe track is synchronized with the tracks of the chill moulds 1 and 2 so that the branch pipe track 6 moves at the same speed as the tracks of the chill moulds 1 and 2. This enables the manufacture of a branched pipe 5 with the apparatus. The branched pipe 5 comprises a manifold 5a and branch pipes 5b arranged thereto. A branched pipe 5 which is as long as desired can be manufactured continuously with the apparatus of the invention. The branched pipe 5 may be cut, if desired, so that the manifold 5a comprises a few branch pipes 5b, the result being a bypass manifold illustrated in FIG. 3a. A branched pipe fitting illustrated in FIG. 3b can be achieved by cutting a continuous branched pipe between each branch pipe 5b. In this application the term "branched pipe" refers not only to continuous branched pipes but also to branched pipes illustrated in FIGS. 3a and 3b, for example. The branch pipe 5b is preferably made flexible, whereby the tolerance of the places of the branched pipe and the pipe to be attached thereto may vary within rather wide limits without the implementation of a joint being very difficult. The joints may be implemented e.g. by welding, by using mechanical joints, by threading or in another appropriate manner.

FIG. 4 is a cross-sectional view of a detail of the apparatus of FIG. 2 along line A—A. Both chill moulds 1 and 2 are provided with a branch pipe cavity 8. When a branched pipe is manufactured, melt material is extruded so that it also fills the branch pipe cavity 8, whereby the branch pipe cavity 8 defines the external dimensions of the branch pipe. The branch pipe track 6 is arranged so that the branch pipe mandrel 7 is substantially in the middle of the branch pipe cavity 8 so that the resulting branch pipe will comprise holes. In that case the manifold 5a and branch pipe 5b are extruded simultaneously, and thus the resulting branched pipe will be free from weld lines. The branch pipe cavities 8 are preferably arranged as illustrated in FIG. 4, i.e. each of the chill moulds 1 and 2 shapes half of the branch pipe 5b and the branch pipe mandrel 7 is arranged between the chill moulds 1 and 2 from their side. It can be ensured that the branch pipe cavity 8 is filled with plastic material e.g. by means of low pressure by sucking air through air channels 9 in a manner known per se. The branch pipe mandrel 7 may be made so long that it extends to the mandrel 10 of the extruder. The branch pipe mandrel 7 may also be made shorter, in which case it does not touch the mandrel 10 of the extruder nor cause any damage to its surface. In that case the branch pipe being manufactured has a solid bottom, which is drilled off before the branch pipe is taken into use.

The chill moulds 1 and 2 can also be formed in the way illustrated in FIG. 5, in which case a pipe from which only the manifold 5a is manufactured by extrusion in the apparatus of the invention. In this case the branch pipes 5b are prefabricated and they are only attached to the material from which a manifold 5a is manufactured during the manufacture of the manifold 5a by means of the branch pipe track 6. Naturally the chill moulds 1 and 2 are provided with cavities so that the prefabricated branch pipes 5b can be attached to the material from which the manifold 5a is formed. Such materials are selected for the prefabricated branch pipe 5b and manifold 5a that the prefabricated branch pipe 5b can fasten firmly and tightly to the manifold 5a. In the manner illustrated in FIG. 5 it is very easy to make the branch pipes 5b flexible by selecting a suitable material for them, even though the material of the manifold 5a were inflexible and hard.

FIG. 6 illustrates a solution in which the branch pipe cavity 8 is arranged in the upper chill mould 1. In this case the branch pipe mandrels 7 are arranged to the chill mould track so that they can move. Thus the pushing inside and pulling out of the branch pipe mandrels 7 can be easily synchronized with the chill mould track. At the beginning of the guide rail of the chill mould track there is a guide pin which pushes the branch pipe mandrel 7 inside and at the end there is a wedge which pulls the branch pipe mandrel 7 out before the chill moulds open, allowing the mould to open.

A solution employing a separate branch pipe track 6 is more difficult to implement due to synchronisation, but its structure is quite simple. At the beginning of the apparatus the branch pipe mandrel 7 is made to approach the chill mould track in a perpendicular direction, and at the end the mandrel is also pulled out in a perpendicular direction. The advantages of a separate branch pipe track 6 come out especially when a branch pipe which comprises inserts e.g. for threads is manufactured or when prefabricated branch pipes are used.

It is possible to form one or more ribs 11 between the branch pipe cavities by providing the chill moulds 1 and 2 with corresponding grooves. By dimensioning the space required by the rib or ribs 11 to correspond substantially to the volume of the branch pipe cavity 8 it is possible to prevent the pressure of the plastic flowing from the nozzle at a constant speed from rising unreasonably high between the branch pipe cavities 8. The solution described allows to ensure that the plastic flowing from the nozzle finds a place where to flow in the mould. If the volume of the mould is enlarged between the branch pipe cavities 8, the volume of the moulds opening out at the feed opening of the plastic remains substantially almost the same all the time. In addition to or instead of the groove forming an annular rib 11 the chill moulds land 2 may be provided with other cavities into which plastic material may flow in the area between the branch pipe holes 8. For example, attachment brackets or the like may be arranged to form on the outer surface of a pipe.

It is possible to provide the chill moulds 1 and 2 or the mandrel 10 or both with heating means 12, such as electric resistors which maintain the mandrel 10 and the chill moulds 1 and 2 at a temperature which is at least about 40° C. higher than the melting point of the plastic material. Thus the apparatus of the invention can heat the plastic to be extruded during the manufacture of a product to such a temperature that it can be crosslinked simultaneously without separate crosslinking means, if the material contains a compound that causes crosslinking by means of heat.

The material to be used for the branched pipe 5 may be any extrudable plastic material. In hot water solutions polysulfone and chlorinated polyvinyl chloride CPVC are good materials, which provide the product with a rigid structure in addition to good thermostability. Polyethylene is a suitable material in connection with conventional cold water and cooling circuit solutions, since a lateral branch can be easily welded thereto. Polyethylene which has a high molecular weight and to which a crosslinking compound is added may also be used, whereby the material of the manifold 5a and the branch pipe 5b is crosslinked polyethylene which has very good properties considering the uses of the pipe. If the crosslinking compound is e.g. peroxide or an azo compound, crosslinking can be brought about by means of heat e.g. in the apparatus for manufacturing a branched pipe by heating the chill moulds to a temperature of about 230° C. The crosslinking agent may also be a silane compound, in which case crosslinking occurs after the manufacture due to the influence of moisture and during the use of the pipe when it comes into contact with water, for example.

FIG. 7a illustrates a branched pipe 5, there being an enlargement 5b' provided at the end of the branch pipe 5b. Thus it is easy to fasten the pipe to be attached to the enlargement 5b'. FIG. 7b in turn illustrates a solution where there is a collar 5b" at the end of the branch pipe 5b. If the branch pipe 5b is made e.g. from crosslinked polyethylene, the collar 5b" yields when stretched, but will however try to return to its original shape and size. If in that case a pipe having an outer diameter larger than the inner diameter of the branch pipe 5b is pushed inside the branch pipe 5b, the collar 5b" functions as a clamping sleeve. Naturally, the enlargement 5b' may also be thickened and arranged to function as a clamping sleeve. The enlargement 5b' and collar 5b" can also be arranged to a prefabricated branch pipe 5b, or the branch pipe hole 8 and branch pipe mandrel 7 may be shaped so that they from an enlargement 5b' and collar 5b".

FIG. 8 illustrates a flow element 13, such as a heating element or a cooling element, which is suitable for floor heating or roof cooling, for example. The flow element 13 comprises a surface layer 14, an insulator 15 and pipes 16 arranged between the insulator 15 and the surface layer 14. The flow element 13 can be manufactured by a continuous process, for example by extrusion, and made as long as desired and then cut into pieces of a desirable length. In the flow element 13 of the invention the pipes 16 are attached to the same liquid circulation by means of the branched pipe 5, which comprises branch pipes 5*b*, which are attached to the pipes 16. A similar branched pipe 5 can be arranged at the other end of the flow element 13, in which case liquid flows from the branched pipe 5 at the first end to a heating or cooling element 13 and out from its other end and further to a similar branched pipe 5. Such a flow element 13 can be manufactured very quickly and easily. Furthermore, the flow element 13 can be almost finished in advance for example in a factory, and thus it can be installed easily with little work.

The drawings and the description related thereto are only intended to illustrate the inventive concept. The details of the invention may vary within the scope of the claims. Thus a branched pipe 5 may also be manufactured in steps, i.e. by first extruding the outer surface of the manifold 5*a* and the branch pipe 5*b* which is extruded to the manifold. After this step the inner surface of the manifold 5*a* can be coated with a layer of plastic material which is the same as or different than the material used for the outer surface by using a separate nozzle. There may be a thermoplastic barrier plastic on the inner surface of the pipe, such as polyketone or poly(ethylenevinyl alcohol) EVOH.

What is claimed is:

1. A method of manufacturing a branched pipe, having a manifold and a pipe branch, comprising:

(a) providing a mold defined by at least two sets of moving chill molds and a mandrel arranged inside the chill molds;

(b) providing means, insertable into and removable from the mold, for forming a pipe branch with the at least two sets of moving chill molds and the mandrel; and (c) extruding plastic material into the mold, with the at least two sets of moving chill molds in motion and with the means for forming a pipe branch inserted into the mold so as to form the branched pipe, wherein the manifold and pipe branch are formed simultaneously.

2. A method of manufacturing a branched pipe according to claim 1, wherein at least one set of the chill molds is provided with a branch pipe cavity so that the pipe branch is extruded to the manifold simultaneously with formation of the manifold, and the means forming a pipe branch is a branch pipe mandrel being arranged inside the branch pipe cavity so that a hole is formed inside the pipe branch.

3. A method of manufacturing a branched pipe according to claim 2, wherein the plastic material is extruded into the mold through a feed opening and into a mold opening, and the at least one set of chill molds is provided with branch pipe cavities and one or more grooves between the branch pipe cavities so that the volume of the mold opening at the feed opening remains substantially almost the same throughout extruding.

4. A method of manufacturing a branched pipe according to claim 1, wherein the means for forming a pipe branch is a prefabricated pipe branch which is attached to the manifold during formation of the manifold.

5. A method of manufacturing a branched pipe according to claim 1, wherein the at one pipe branch is made of flexible material.

6. A method of manufacturing a branched pipe according to claim 1, wherein the method further comprises adding to the plastic material a compound that causes crosslinking of the plastic material upon application of heat and, after the extruding, heating the plastic material with the heated chill molds or a heated mandrel or both to a temperature that causes the plastic material to crosslink.

\* \* \* \* \*